United States Patent
Navarrete et al.

(10) Patent No.: US 11,640,581 B2
(45) Date of Patent: May 2, 2023

(54) METHODS FOR IMPROVED DELTA VELOCITY DETERMINATION USING MACHINE LEARNING AND DEVICES THEREOF

(71) Applicant: Mitchell International, Inc., San Diego, CA (US)

(72) Inventors: Jonathan Navarrete, San Diego, CA (US); Olaf Wied, San Diego, CA (US); Norman E. Tyrrell, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 822 days.

(21) Appl. No.: 16/570,751

(22) Filed: Sep. 13, 2019

(65) Prior Publication Data

US 2020/0090429 A1    Mar. 19, 2020

Related U.S. Application Data

(60) Provisional application No. 62/731,259, filed on Sep. 14, 2018.

(51) Int. Cl.

| | |
|---|---|
| *G06Q 10/10* | (2023.01) |
| *G07C 5/08* | (2006.01) |
| *G07C 5/00* | (2006.01) |
| *G06N 3/08* | (2023.01) |
| *G06F 18/214* | (2023.01) |
| *G06V 10/764* | (2022.01) |
| *G06V 10/82* | (2022.01) |

(52) U.S. Cl.
CPC ........... *G06Q 10/10* (2013.01); *G06F 18/214* (2023.01); *G06N 3/08* (2013.01); *G06V 10/764* (2022.01); *G06V 10/82* (2022.01); *G07C 5/008* (2013.01); *G07C 5/0866* (2013.01)

(58) Field of Classification Search
None
See application file for complete search history.

(56) References Cited

U.S. PATENT DOCUMENTS

| | | | |
|---|---|---|---|
| 6,885,981 B2 | 4/2005 | Bomar et al. | |
| 2007/0288135 A1* | 12/2007 | Kidd | G01M 17/0078 |
| | | | 701/31.4 |
| 2010/0228432 A1* | 9/2010 | Smith | G07C 5/002 |
| | | | 702/113 |
| 2012/0146766 A1* | 6/2012 | Geisler | G07C 5/085 |
| | | | 340/8.1 |

* cited by examiner

*Primary Examiner* — Adam D Tissot
*Assistant Examiner* — Garrett F Evans
(74) *Attorney, Agent, or Firm* — Sheppard Mullin Richter & Hampton LLP

(57) ABSTRACT

Methods, non-transitory computer readable media, and insurance claim analysis devices are disclosed that provide an improved, automated delta velocity determination. With this technology, one or more images of a damaged motor vehicle and contextual data, associated with an electronic insurance claim and a motor vehicle accident involving the damaged motor vehicle, are obtained. The obtained images and one or more portions of the contextual data are compared to historical sets of images of damaged motor vehicles and corresponding additional contextual data and actual delta velocity values. A delta velocity value is calculated based on the comparison. The calculated delta velocity value is provided to verify damage severity during automated processing of the electronic insurance claim.

15 Claims, 4 Drawing Sheets

METHODS FOR IMPROVED DELTA VELOCITY DETERMINATION USING MACHINE LEARNING AND DEVICES THEREOF

This application claims the benefit of U.S. Provisional Patent Application Ser. No. 62/731,259, filed on Sep. 14, 2018, which is hereby incorporated by reference in its entirety.

FIELD

This technology generally relates to methods, non-transitory computer readable media, and devices for improved delta velocity determination using machine learning.

BACKGROUND

Delta velocity refers to the change in velocity of a motor vehicle during a collision event. Delta velocity values are often used to assess motor vehicle accident severity as well as for research and other purposes. For example, delta velocity values can inform injury-causation relation or the likelihood that particular injuries (e.g., as associated with an insurance claim) resulted from a particular motor vehicle accident. In other examples, delta velocity values can help dispute the facts of loss associated with an insurance claim and can inform motor vehicle damage estimates.

Currently, insurance adjusters manually inspect and analyze damaged motor vehicles associated with an insurance claim, with respect to crush width and/or depth, for example, in order to determine delta velocity values in a relatively labor-intensive process. Accordingly, delta velocity determination are subjective, inconsistent, often inaccurate, and occur relatively late in the insurance claim lifecycle. These deficiencies in delta velocity values negatively impact the accuracy and efficiency of the end-to-end insurance claim adjudication process, and result in ineffective insurance claim determinations.

SUMMARY

A method for improved, automated delta velocity determination is disclosed. The method includes obtaining, by an insurance claim analysis device, one or more images of a damaged motor vehicle and contextual data associated with an electronic insurance claim and a motor vehicle accident involving the damaged motor vehicle. The obtained images and one or more portions of the contextual data are compared to historical sets of images of damaged motor vehicles and corresponding additional contextual data and actual delta velocity values. A delta velocity value is calculated based on the comparison. The calculated delta velocity value is provided to verify damage severity during automated processing of the electronic insurance claim.

An insurance claim analysis device is disclosed that includes memory including programmed instructions stored thereon and one or more processors configured to execute the stored programmed instructions to obtain one or more images of a damaged motor vehicle and contextual data associated with an electronic insurance claim and a motor vehicle accident involving the damaged motor vehicle. The obtained images and one or more portions of the contextual data are compared to historical sets of images of damaged motor vehicles and corresponding additional contextual data and actual delta velocity values. A delta velocity value is calculated based on the comparison. The calculated delta velocity value is provided to verify damage severity during automated processing of the electronic insurance claim.

A non-transitory machine readable medium is disclosed that has stored thereon instructions for improved, automated delta velocity determination including executable code that, when executed by one or more processors, causes the processors to obtain one or more images of a damaged motor vehicle and contextual data associated with an electronic insurance claim and a motor vehicle accident involving the damaged motor vehicle. The obtained images and one or more portions of the contextual data are compared to historical sets of images of damaged motor vehicles and corresponding additional contextual data and actual delta velocity values. A delta velocity value is calculated based on the comparison. The calculated delta velocity value is provided to verify damage severity during automated processing of the electronic insurance claim.

This technology has a number of associated advantages including providing methods, non-transitory computer readable media, and insurance claim analysis devices that facilitate improved, automated delta velocity determination. This technology automatically analyzes image(s) of a damaged motor vehicle and contextual data for an associated motor vehicle accident and generates a calculated delta velocity value without requiring any physical measurements of the damaged motor vehicle. This technology utilizes digital image analysis and machine learning to advantageously generate a more consistent, objective delta velocity value automatically and earlier in the insurance claim adjudication process.

DETAILED DESCRIPTION

Figure 1:
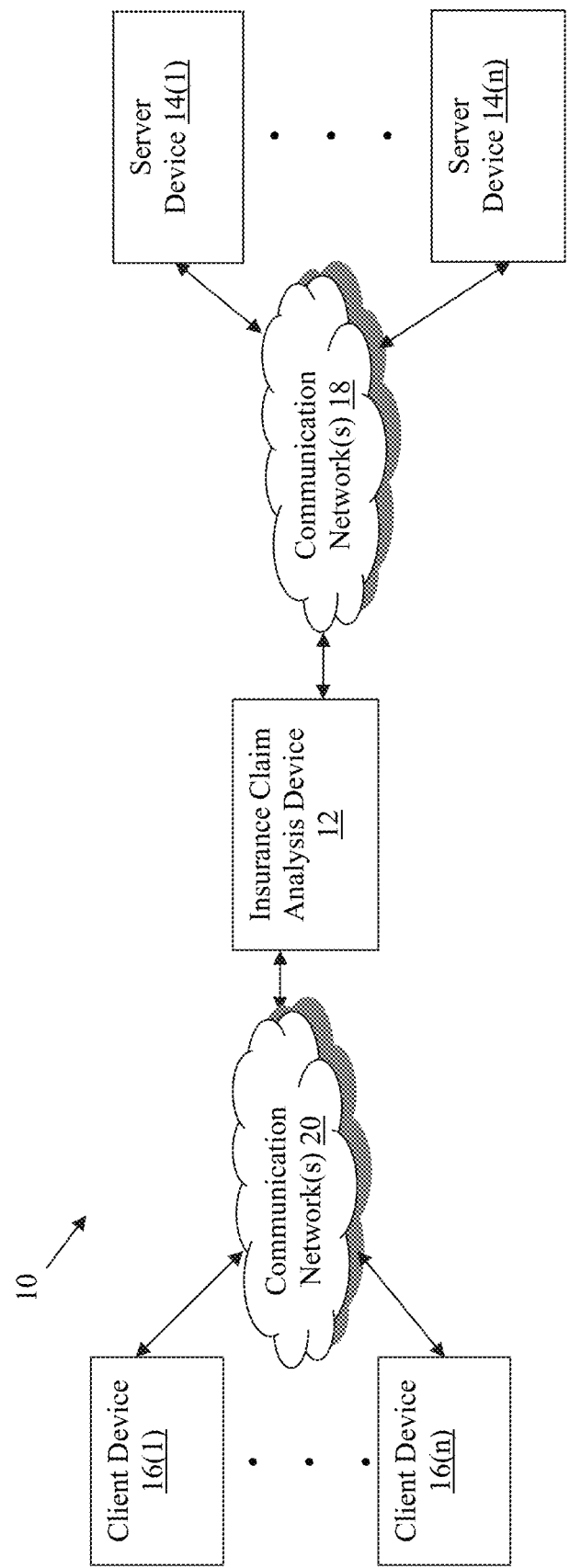
FIG. 1 a block diagram of a network environment with an exemplary insurance claim analysis device.

Referring to FIG. 1, an exemplary network environment 10 with an exemplary insurance claim analysis device 12 is illustrated. The insurance claim analysis device 12 in this example is coupled to a plurality of server devices 14(1)-14(n) and a plurality of client devices 16(1)-16(n) via communication network(s) 18 and 20, respectively, although the insurance claim analysis device 12, server devices 14(1)-14(n), and/or client devices 16(1)-16(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and insurance claim analysis devices that automatically analyze motor vehicle accident damage severity by applying a neural network, for example, to damaged motor vehicle images and contextual data associated with a motor vehicle accident to efficiently and effectively generate a calculated delta velocity value.

Figure 2:
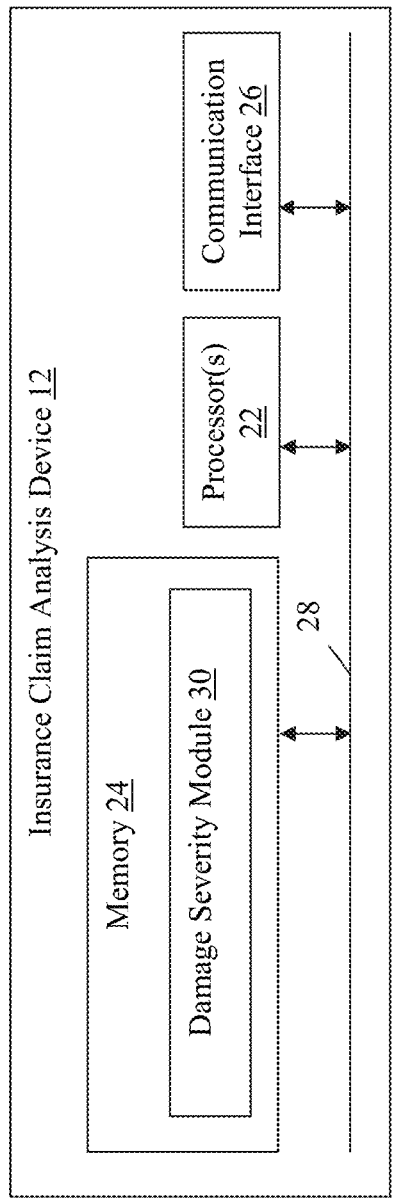
FIG. 2 is a block diagram of the exemplary insurance claim analysis device of FIG. 1.

Referring to FIGS. 1-2, the insurance claim analysis device 12 in this example includes processor(s) 22, a memory 24, and/or a communication interface 26, which are coupled together by a bus 28 or other communication link, although the insurance claim analysis device 12 can include other types and/or numbers of elements in other configurations. The processor(s) 22 of the insurance claim analysis device 12 may execute programmed instructions stored in the memory 24 for the any number of the functions described and illustrated herein. The processor(s) 22 of the insurance claim analysis device 12 may include one or more CPUs or general purpose processors with one or more processing cores, for example, although other types of processor(s) can also be used.

The memory 24 of the insurance claim analysis device 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Figure 3:
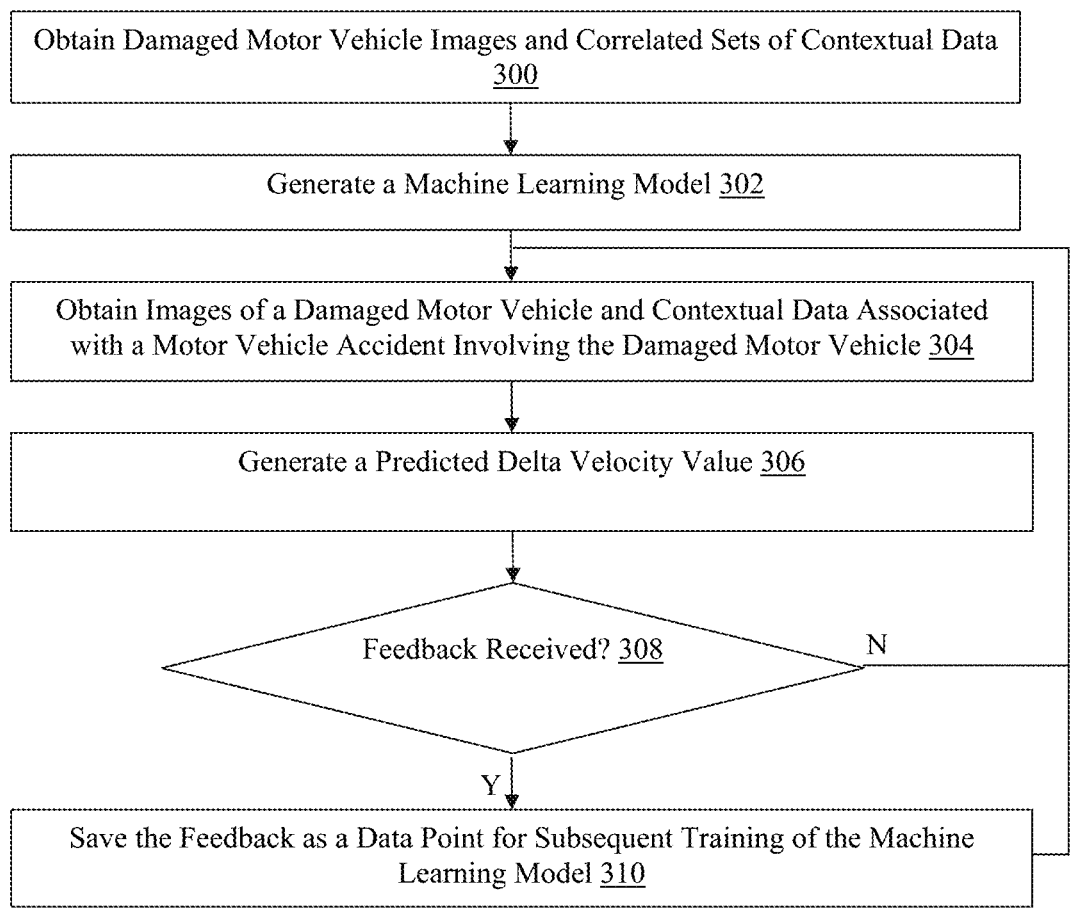
FIG. 3 is a flowchart of an exemplary method for improved, automated delta velocity determination.

Accordingly, the memory 24 of the insurance claim analysis device 12 can store application(s) that can include executable instructions that, when executed by the processor(s) 22, cause the insurance claim analysis device 12 to perform actions, such as to transmit, receive, or otherwise process network messages, for example, and to perform other actions described and illustrated below with reference to FIGS. 3-4. The application(s) can be implemented as modules or components of other application(s). Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the insurance claim analysis device 12 itself, may be located in virtual server(s) running in a cloud-based computing environment rather than being tied to one or more specific physical network computing devices. Also, the application(s) may be running in one or more virtual machines (VMs) executing on the insurance claim analysis device 12. Additionally, in one or more embodiments of this technology, virtual machine(s) running on the insurance claim analysis device may be managed or supervised by a hypervisor.

In this particular example, the memory 24 of the insurance claim analysis device 12 includes a damage severity module 30, although the memory 24 can include other policies, modules, databases, or applications, for example. The damage severity module 30 in this example is configured to train a machine learning model, such as an artificial or convolutional neural network, based on ingested, historical images of damaged motor vehicles and sets of contextual data for motor vehicle accidents associated with the damaged motor vehicles.

The damage severity module 30 is further configured to apply the neural network in one example to images of a damaged motor vehicle and contextual data associated with a particular motor vehicle accident and automatically generate and output a calculated delta velocity value associated with the motor vehicle accident, as described and illustrated in more detail later with reference to FIG. 3. The delta velocity value is an indication of damage severity for the motor vehicle accident, and can be used for research, to confirm or dispute the facts of loss associated with an insurance claim, to inform damage estimates for an insurance claim, or to assess the relation of injury treatment reported on an insurance claim to a motor vehicle accident, among other applications.

The communication interface 26 of the insurance claim analysis device 12 operatively couples and communicates between the insurance claim analysis device 12, the server devices 14(1)-14(n), and/or the client devices 16(1)-16(n), which are all coupled together by the communication network(s) 18 and 20, although other types and/or numbers of communication networks or systems with other types and/or numbers of connections and/or configurations to other devices and/or elements can also be used.

By way of example only, the communication network(s) 18 and 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 and 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The insurance claim analysis device 12 can be a stand-alone device or integrated with one or more other devices or apparatuses, such as one or more of the server devices 14(1)-14(n), for example. In one particular example, the insurance claim analysis device 12 can include or be hosted by one of the server devices 14(1)-14(n), and other arrangements are also possible.

Each of the server devices 14(1)-14(n) in this example includes processor(s), a memory, and a communication interface, which are coupled together by a bus or other communication link, although other numbers and/or types of network devices could be used. The server devices 14(1)-14(n) in this example host content associated with insurance carrier(s) including insurance claim data that can include images of damaged motor vehicle, vehicle data, occupant data, and/or injury data, for example.

Although the server devices 14(1)-14(n) are illustrated as single devices, one or more actions of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network devices that operate using a master/slave approach, whereby one of the network devices of the server devices 14(1)-14(n) operate to manage and/or otherwise coordinate operations of the other network devices.

The server devices 14(1)-14(n) may operate as a plurality of network devices within a cluster architecture, a peer-to peer architecture, virtual machines, or within a cloud architecture, for example. Thus, the technology disclosed herein is not to be construed as being limited to a single environment and other configurations and architectures are also envisaged.

The client devices 16(1)-16(n) in this example include any type of computing device that can interface with the insurance claim analysis device 12 to submit data and/or receive GUI(s). Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard web browsers or standalone client applications, which may provide an interface to communicate with the insurance claim analysis device 12 via the communication network(s) 20. The client devices 16(1)-16(n) may further include a display device, such as a display screen or touchscreen, and/or an input device, such as a keyboard, for example. In one example, the client devices 16(1)-16(n) can be utilized by insurance adjusters to facilitate an improved analysis of insurance claim data, as described and illustrated herein, although other types of client devices utilized by other types of users can also be used in other examples.

Although the exemplary network environment 10 with the insurance claim analysis device 12, server devices 14(1)-14(n), client devices 16(1)-16(n), and communication network(s) 18 and 20 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 10, such as the insurance claim analysis device 12, client devices 16(1)-16(n), or server devices 14(1)-14(n), for example, may be configured to operate as virtual instances on the same physical machine. In other words, one or more of the insurance claim analysis device 12, client devices 16(1)-16(n), or server devices 14(1)-14(n) may operate on the same physical device rather than as separate devices communicating through communication network(s). Additionally, there may be more or fewer insurance claim analysis devices, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only wireless networks, cellular networks, PDNs, the Internet, intranets, and combinations thereof.

The examples may also be embodied as one or more non-transitory computer readable media (e.g., the memory 24) having instructions stored thereon for one or more aspects of the present technology as described and illustrated by way of the examples herein. The instructions in some examples include executable code that, when executed by one or more processors (e.g., the processor(s) 22), cause the processor(s) to carry out steps necessary to implement the methods of the examples of this technology that are described and illustrated herein.

An exemplary method of improved, automated delta velocity determination will now be described with reference to FIGS. 3-4. Referring more specifically to FIG. 3, a flowchart of an exemplary method for utilizing machine learning to calculate a delta velocity value for a motor vehicle accident is illustrated. In step 300 in this example, the insurance claim analysis device 12 obtains a training data set that includes damaged motor vehicle images and a set of contextual data for a plurality of motor vehicle accidents.

The damaged motor vehicle images and/or contextual data can be associated with historical insurance claims and can be obtained from insurance carrier(s) hosting one or more of the server devices 14(1)-14(n) and/or a National Highway Traffic Safety Administration (NHTSA) National Automotive Sampling System (NASS) database, for example, and other sources of one or more portions of the training data set can also be used. Additionally, the contextual data can include vehicle data, occupant data for an occupant of a damaged motor vehicle, and/or injury data for the occupant, for example, although other types of data can also be obtained in step 300.

In some examples, the vehicle data can include damaged motor vehicle type, age, size, and/or weight, an area of impact, a damage extent, crush measurement(s) (e.g., crush width or depth), or whether a damaged motor vehicle was drivable subsequent to an associated motor vehicle accident, for example. The occupant data can include demographic data regarding occupants, such as an occupant age, weight, height, or gender, where an occupant was sitting in a damaged motor vehicle, a point of impact on a damaged motor vehicle, or whether an airbag deployed as a result of an associated motor vehicle accident, for example. The injury data in some examples includes condition indication(s) (e.g., ICD code(s)) associated with an injury or treatment reported as part of an insurance claim associated with a motor vehicle accident, for example.

In step 302, the insurance claim analysis device 12 generates or trains a machine learning model based on the training data set including the damaged motor vehicle images and correlated sets of contextual data obtained in step 300. In one example, the machine learning model is a neural network, such as an artificial or convolutional neural network, although other types of neural networks or machine learning models can also be used in other examples. In this example, the insurance claim analysis device 12 can generate the machine learning model by training the neural network using the damaged motor vehicle images and sets of contextual data obtained in step 300.

In step 304, the insurance claim analysis device 12 obtains a new insurance claim that includes image(s) of a damaged motor vehicle and contextual data associated with a motor vehicle accident involving the damaged motor vehicle. The image(s) and contextual data can be obtained form one or more of the server devices 14(1)-14(n) and/or one of the client devices 16(1)-16(n), for example. In some examples, a plurality of images of the damaged motor vehicle are obtained such that one or more of the images are from a different perspective view than one or more other of the images, although a single image of a damaged motor vehicle can also be obtained in step 304 in other examples.

In step 306, the insurance claim analysis device 12 applies the machine learning model to the image(s) and contextual data obtained in step 304 to generate a calculated delta velocity value associated with the motor vehicle accident, which is not well-understood routine, or conventional in the art. Advantageously, analyzing digital images of damaged vehicles and contextual data automatically using a machine learning model provides a practical application of this technology in the form of earlier, automated, consistent, and objective damage severity analysis for motor vehicle accidents, and solves a technical problem in the image analysis art.

In examples in which a neural network is used for the machine learning model, the neural network can leverage certain features of the obtained damaged motor vehicle image(s), such as edges or shadows associated with an identified area of impact, for example and particular portions of the obtained contextual data, which is merged with the images and set of contextual data used to train the neural network, to generate a calculated delta velocity value. Other methods of applying the machine learning model and/or automatically generating the calculated delta velocity value can also be used in other examples.

Optionally, the insurance claim analysis device 12 can output the calculated delta velocity value, such as to a graphical user interface (GUI) configured to be displayed on a display device of a requesting one of the client devices 16(1)-16(n), for example. In other examples, the calculated delta velocity value can be output to a computer application or process, or otherwise automatically utilized to determine the relation of a reported injury treatment to a motor vehicle accident, for example. Other methods of providing or utilizing the calculated delta velocity value can also be used in other examples.

Figure 4:
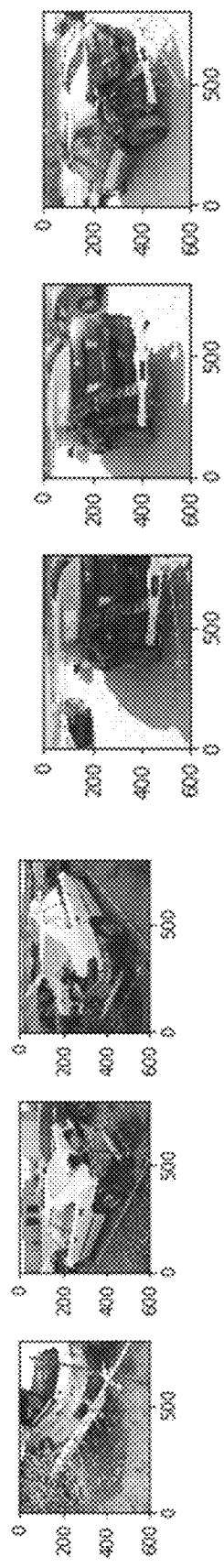
FIG. 4 is an exemplary sets of damaged motor vehicle images and associated calculated and actual delta velocity values.
Figure 4:
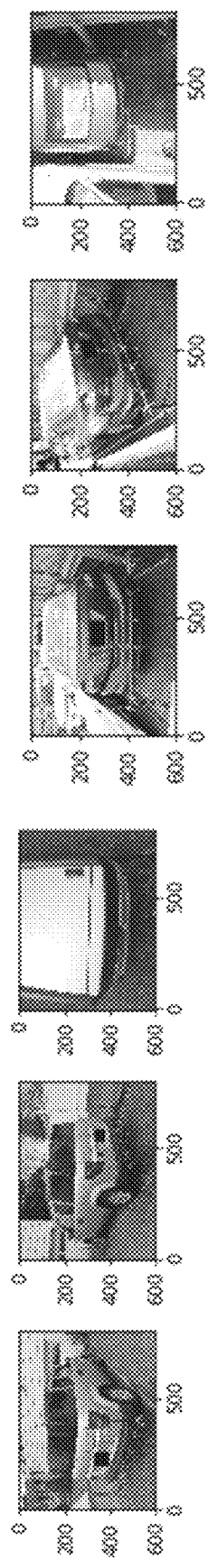

Referring more specifically to FIG. 4, exemplary sets of damaged motor vehicle images and associated calculated and actual delta velocity (referred to in FIG. 4 as "Delta V") values is illustrated. In this example, the calculated delta velocity values are generated according to the method described and illustrated herein with reference to steps 300-310 of FIG. 3. Additionally, the actual delta velocity values are generated by an insurance claim adjuster through a labor-intensive and inefficient method requiring physical measuring of crush depth and width of an impacted area of a damaged motor vehicle, as is known in the art.

Referring back to FIG. 3, in step 308, the insurance claim analysis device 12 optionally determines whether any feedback is received with respect to the calculated delta velocity value that can be used to further train the machine learning model. In some examples, the feedback can be automated in the form of an actual delta velocity value generated and provided by a telematics device within a damaged motor vehicle involved in a motor vehicle accident, although other types of actual delta velocity values and other methods of receiving feedback can also be used in other examples.

If the insurance claim analysis device 12 determines that feedback is received, then the Yes branch is taken step 310, and the feedback data and calculated delta velocity values, along with associated damaged motor vehicle image(s) and contextual data, are saved as a data point for future training data sets that can be used to further train or update the machine learning model, as described earlier with reference to step 302. Subsequent to saving the feedback as a data point in step 310, or if the insurance claim analysis device 12 determines in step 308 that feedback is not received and the No branch is taken, then the insurance claim analysis device 12 proceeds back to step 304 and again obtains image(s) of a damaged motor vehicle and contextual data associated with another motor vehicle accident that may be associated with another insurance claim.

With this technology, a calculated delta velocity value can be generated and provided more efficiently based on an automated analysis of image(s) of a damaged motor vehicle and contextual data for an associated motor vehicle accident, without requiring any physical measurements of the damaged motor vehicle. This technology utilizes digital image analysis and a machine learning model, such as a neural network, to advantageously generate a more consistent, objective calculated delta velocity value automatically and, in the context of insurance claims, earlier in the adjudication process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved, automated delta velocity determination, the method comprising:
   obtaining, by an insurance claim analysis device, one or more images of a damaged motor vehicle and contextual data associated with an electronic insurance claim and a motor vehicle accident involving the damaged motor vehicle;
   calculating, by the insurance claim analysis device, a delta velocity value by applying a trained machine learning model to the obtained images and contextual data, wherein the trained machine learning model has been trained using historical sets of images of damaged motor vehicles and corresponding additional contextual data and actual delta velocity values, each of the historical sets associated with another motor vehicle accident or insurance claim; and
   providing, by the insurance claim analysis device, the calculated delta velocity value to verify damage severity during automated processing of the electronic insurance claim.

2. The method of claim 1, further comprising updating, by the insurance claim analysis device, the machine learning model based on another actual delta velocity value for the damaged motor vehicle associated with the motor vehicle accident.

3. The method of claim 1, wherein the machine learning model comprises an artificial or convolutional neural network.

4. The method of claim 1, further comprising obtaining, by the insurance claim analysis device, at least the historical sets of images of damaged motor vehicles and corresponding additional contextual data from a National Highway Traffic Safety Administration (NHTSA) National Automotive Sampling System (NASS) database.

5. The method of claim 1, wherein the one or more images comprise a plurality of digital images and each of the digital images comprises a unique perspective view of the damaged motor vehicle.

6. An insurance claim analysis device, comprising memory comprising programmed instructions stored thereon and one or more processors configured to execute the stored programmed instructions to:
   obtain one or more images of a damaged motor vehicle and contextual data associated with an electronic insurance claim and a motor vehicle accident involving the damaged motor vehicle;
   calculate a delta velocity value by applying a trained machine learning model to the obtained images and contextual data, wherein the trained machine learning model has been trained using historical sets of images of damaged motor vehicles and corresponding additional contextual data and actual delta velocity values, each of the historical sets associated with another motor vehicle accident or insurance claim; and provide the calculated delta velocity value to verify damage severity during automated processing of the electronic insurance claim.

7. The insurance claim analysis device of claim 6, wherein the processors are further configured to execute the stored programmed instructions to update the machine learning model based on another actual delta velocity value for the damaged motor vehicle associated with the motor vehicle accident.

8. The insurance claim analysis device of claim 6, wherein the machine learning model comprises an artificial or convolutional neural network and the processors are further configured to execute the stored programmed instructions to train the neural network using the historical sets of images of damaged motor vehicles and corresponding additional contextual data and actual delta velocity values, each of the historical sets associated with another motor vehicle accident or insurance claim.

9. The insurance claim analysis device of claim 6, wherein the processors are further configured to execute the stored programmed instructions to obtain at least the historical sets of images of damaged motor vehicles and corresponding additional contextual data from a National Highway Traffic Safety Administration (NHTSA) National Automotive Sampling System (NASS) database.

10. The insurance claim analysis device of claim 6, wherein the one or more images comprise a plurality of digital images and each of the digital images comprises a unique perspective view of the damaged motor vehicle.

11. A non-transitory machine readable medium having stored thereon instructions for improved, automated delta velocity determination comprising executable code that, when executed by one or more processors, causes the processors to:

obtain one or more images of a damaged motor vehicle and contextual data associated with an electronic insurance claim and a motor vehicle accident involving the damaged motor vehicle;

calculate a delta velocity value by applying a trained machine learning model to the obtained images and contextual data, wherein the trained machine learning model has been trained using historical sets of images of damaged motor vehicles and corresponding additional contextual data and actual delta velocity values, each of the historical sets associated with another motor vehicle accident or insurance claim; and provide the calculated delta velocity value to verify damage severity during automated processing of the electronic insurance claim.

12. The non-transitory machine readable medium of claim 11, wherein the executable code, when executed by the processors, further causes the processors to update the machine learning model based on another actual delta velocity value for the damaged motor vehicle associated with the motor vehicle accident.

13. The non-transitory machine readable medium of claim 11, wherein the machine learning model comprises an artificial or convolutional neural network.

14. The non-transitory machine readable medium of claim 11, wherein the executable code, when executed by the processors, further causes the processors to obtain at least the historical sets of images of damaged motor vehicles and corresponding additional contextual data from a National Highway Traffic Safety Administration (NHTSA) National Automotive Sampling System (NASS) database.

15. The non-transitory machine readable medium of claim 11, wherein the one or more images comprise a plurality of digital images and each of the digital images comprises a unique perspective view of the damaged motor vehicle.

\* \* \* \* \*